(12) United States Patent
Ding et al.

(10) Patent No.: US 11,225,416 B2
(45) Date of Patent: Jan. 18, 2022

(54) DRY GEL SYNTHESIS OF NANO-SIZED ZSM-5

(71) Applicant: Saudi Arabian Oil Company, Dhahran (SA)

(72) Inventors: Lianhui Ding, Dhahran (SA); Manal Al-Eid, Dhahran (SA); Rasha Alghamdi, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/696,962

(22) Filed: Nov. 26, 2019

(65) Prior Publication Data

US 2021/0155490 A1 May 27, 2021

(51) Int. Cl.
*C01B 39/40* (2006.01)
*B01J 29/40* (2006.01)
*B01J 37/10* (2006.01)
B82Y 30/00 (2011.01)
C01B 39/04 (2006.01)

(52) U.S. Cl.
CPC .............. *C01B 39/40* (2013.01); *B01J 29/40* (2013.01); *B82Y 30/00* (2013.01); *C01B 39/04* (2013.01); *C01P 2004/64* (2013.01); *C01P 2006/14* (2013.01); *C01P 2006/16* (2013.01)

(58) Field of Classification Search
CPC ....... C01B 39/40; C01P 2004/64; B01J 29/40; B01J 37/10
See application file for complete search history.

(56) References Cited

U.S. PATENT DOCUMENTS

| | | | |
|---|---|---|---|
| 4,180,689 A | 12/1979 | Davies et al. | |
| 4,740,292 A | 4/1988 | Chen et al. | |
| 5,939,362 A | 8/1999 | Johnson et al. | |
| 6,232,273 B1 | 5/2001 | Namba et al. | |
| 8,951,498 B2 | 2/2015 | Larsen et al. | |
| 9,145,465 B2 | 9/2015 | Spencer et al. | |
| 9,493,598 B2 | 11/2016 | Musa et al. | |

(Continued)

FOREIGN PATENT DOCUMENTS

| | | |
|---|---|---|
| AU | 465697 | 10/1972 |
| AU | 2014413311 | 7/2017 |

(Continued)

OTHER PUBLICATIONS

Robson et al, Verified Synthesis of Zeolitic Materials, 2001 Elsevier Science (Year: 2001).*

(Continued)

*Primary Examiner* — David M Brunsman
(74) *Attorney, Agent, or Firm* — Fish & Richardson P.C.

(57) ABSTRACT

Examples described herein provide a method of making a nano-sized zeolite. The method comprises dissolving an aluminum source in a first portion of an aqueous solution of a templating agent to form a first mixture. The first mixture is added to a slurry of a silica source in a second portion of the aqueous solution of a templating agent to form an aluminosilicate fluid gel. The aluminosilicate fluid gel is stirred to allow reaction. The aluminosilicate fluid gel is dried to form a dry gel and the dry gel is hydrothermal treated in a hydrothermal treatment holder to form a solid product. The solid product is washed, dried, and calcined.

16 Claims, 4 Drawing Sheets

(56) References Cited

U.S. PATENT DOCUMENTS

| | | | |
|---|---|---|---|
| 2011/0277844 | A1 | 11/2011 | Musa et al. |
| 2012/0025882 | A1 | 2/2012 | Shanan |
| 2013/0123147 | A1 | 5/2013 | Musa et al. |
| 2015/0322330 | A1 | 11/2015 | Spencer et al. |
| 2017/0321108 | A1 | 11/2017 | Majnouni et al. |
| 2019/0168197 | A1 | 6/2019 | Corma Canos et al. |

FOREIGN PATENT DOCUMENTS

| | | |
|---|---|---|
| CN | 106430235 | 2/2017 |
| CN | 109437232 | 3/2019 |
| EP | 0186447 | 1/1991 |
| EP | 2162392 | 8/2012 |
| EP | 2449153 | 1/2019 |
| WO | WO 1993025798 | 12/1993 |
| WO | WO 1998051902 | 11/1998 |
| WO | WO 2017202495 | 11/2017 |

OTHER PUBLICATIONS

Rao et al, "Dry conversion technique for synthesis of zeolite BEA" Chem Commun 1996, pp. 1441-1442 (Year: 1996).*

Petkowicz et al, "Dry-gel process for zeolite synthesis: Some fundamental aspects", Microporous and Mesoporous Materials 179 (2019) pp. 92-98 published (Dec. 15, 2018) (Year: 2018).*

Mohammadparast et al, "The synthesis of nano-sized ZSM-5 zeolite by dry gel conversion method and investigating the effects of experimental parameters by Taguchi experimental design", Journal of Experimental Nanoscience, (Apr. 2018) (Year: 2018).*

Matsukata et al, "Crystallization behaviour of zeolite beta during steam-assisted crystallization of dry gel", Micropoprous and Mesoporous Materials 56/ (2002) pp. 1-10 (Year: 2002).*

Bandyopadhyay et al, "Synthesis of borosilicate zeolites by the dry gel conversion method and their characterization", Microporous and Mesoporous Materials 32 (1999) 81-91 (Year: 1999).*

Akhtar et al, "Aromatization of alkanes over Pt promoted conventional and mesoporous gallosilicates of MEL zeolite," Catalysis Today vol. 179, Issue 1, Jan. 2012, pp. 61-72, 12 pages.

Bhattacharya et al, "Aromatization of n-hexane over H-ZSM-5: Influence of promoters and added gases," Applied Catalysis A: General, vol. 141, issues 1-2, Jul. 1996, pp. 105-115, 11 pages.

Bibby et al, "NH4+-tetraalkyl ammonium systems in the synthesis of zeolites," Nature, 285(5759), pp. 30-31, May 1980, 2 pages.

Camblor et al, "Characterization of nanocrystalline zeolite Beta," Microporous and Mesoporous Materials, vol. 25, Issues 1-3, Dec. 1998, pp. 59-74, 16 pages.

Camblor et al, "Synthesis of nanocrystalline zeolite beta in the absence of alkali metal cations," Studies in Surface Science and Catalysis vol. 105, 1997, pp. 341-348.

Ding et al, "Effect of agitation on the synthesis of zeolite beta and its synthesis mechanism in absence of alkali cations," Microporous and Mesoporous Materials, vol. 94, Issues 1-3, Sep. 2006, pp. 1-8.

Dyballa et al, "Parameters influencing the selectivity to propene in the MTO conversion on 10-ring zeolites: directly synthesized zeolites ZSM-5, ZSM-11, and ZSM-22," Applied Catalysis A: General, vol. 510, Jan. 2016, pp. 233-243, 41 pages.

Farrusseng et al, "Zeolite-Encapsulated Catalysts: Challenges and Prospects," Encapsulated Catalysts, Chapter 11, 2017, pp. 335-386, 52 pages.

Garcia-Martinez et al, "A mesostructured Y zeolite as a superior FCC catalyst—from lab to refinery," Chem. Commun., vol. 48, issue 97, pp. 11841-11843, Aug. 2012, 3 pages.

Garcia-Martinez et al, "Mesostructured zeolite Y—high hydrothermal stability and superior FCC catalytic performance," Catalysis Science and Technology, 2(5), pp. 987-994, 2012, 8 pages.

Ghamami et al, "Synthesis and crystal growth of zeolite (NH4, TPA)-ZSM-5," Zeolites, vol. 3, issue 2, Apr. 1983, pp. 155-162, 8 pages.

Hou et al, "Nucleation and Growth of NH4-ZSM-5 Zeolites," Studies in Surface Science and Catalysis, vol. 28, 1986, pp. 239-246, 8 pages.

Kalita et al., "Studies on stability of nanocrystalline MFI zeolite synthesized by a novel method against OH-attack," Materials Chemistry and Physics, vol. 129, issue 1-2, Sep. 2011, pp. 371-379, 9 pages.

Kim et al, "Oligomerization and isomerization of dicyclopentadiene over mesoporous materials produced from zeolite beta," Catalysis Today, 232, Sep. 2014, pp. 69-74, 6 pages.

Landau et al, "Colloidal Nanocrystals of Zeolite β Stabilized in Alumina Matrix," Chem. Mater., Apr. 1999, 11, 8, pp. 2030-2037, 8 pages.

Li et al, "Realizing the Commercial Potential of Hierarchical Zeolites: New Opportunities in Catalytic Cracking" Chem Cat Chem Review, 6, 10, pp. 46-66, Sep. 2013, 22 pages.

Liu et al, "Synthesis, characterization, and catalytic performance of hierarchical ZSM-11 zeolite synthesized via dual-template route," Chinese Journal of Catalysis, vol. 39, Issue 1, Jan. 2018, pp. 167-180, 14 pages.

Ma et al, "A review of zeolite-like porous materials," Microporous and Mesoporous Materials, vol. 37, Issues 1-2, May 2000, pp. 243-252, 10 pages.

Manimaran et al, "Corrosion Inhibition of carbon steel by polyacrylamide," Research Journal of Chemical Sciences, vol. 2(3), pp. 52-57, Mar. 2012, 6 pages.

Meng et al, "Templating route for synthesizing mesoporous zeolites with improved catalytic properties," Nano Today 4(4), pp. 292-301, Jun. 2009, 10 pages.

Micromeritics [online], "AutoChem II 2920: The Catalyst Characterization Laboratory," AutoChem II brochure, accessed Sep. 30, 2019, URL: <https://www.micromeritics.com/Repository/Files/autochem2920-brochure-2017.pdf> 2007, 5 pages.

Prokesova et al, "Preparation of nanosized micro/mesoporous composites via simultaneous synthesis of Beta/MCM-48 phases," Microporous and Mesoporous Materials vol. 64, Issues 1-3, Oct. 2003, pp. 165-174, 10 pages.

Qin et al, "Mesoporous Y zeolite with homogeneous aluminum distribution obtained by sequential desilication-dealumination and its performance in the catalytic cracking of cumene and 1,3,5-triisopropylbenzene," Journal of Catalysis, vol. 278, Feb. 2011, pp. 266-275, 10 pages.

Van Grieken et al, "Anomalous crystallization mechanism in the synthesis of nanocrystalline ZSM-5," Microporous Mesoporous Materials, vol. 39, issues 1-2, Sep. 2000, pp. 135-147, 13 pages.

Viswanadham et al, "Reaction pathways for the aromatization of paraffins in the presence of H-ZSM-5 and Zn/H-ZSM-5," Applied Catalysis A: General vol. 137, Issue 2, Apr. 1996, pp. 225-233, 9 pages.

Webb, "Introduction to Chemical Adsorption Analytical Techniques and their Applications to Catalysis," MIC Technical Publications, Micromeritics, Jan. 2003, 12 pages.

Xue et al, "Facile synthesis of nano-sized NH4-ZSM-5 zeolites," Microporous and Mesoporous Materials, vol. 156, Jul. 2012, pp. 29-35, 7 pages.

Yang et al, "Incorporating platinum precursors into a NaA-zeolite synthesis mixture promoting the formation of nanosized zeolite," Microporous and Mesoporous Materials, 117(1-2), Jan. 2009, pp. 33-40, 8 pages.

Zhang et al, "Differences between ZSM-5 and ZSM-11 zeolite catalysts in 1-hexene aromatization and isomerization," Fuel Processing Technology vol. 91, Issue 5, May 2010, pp. 449-455, 7 pages.

Zhang et al, "Innovations in hierarchical zeolite synthesis," Catalysis Today, vol. 264, Apr. 2016, pp. 3-15, 13 pages.

PCT International Search Report and Written Opinion in International Appln. No. PCT/US2020/061105, dated Feb. 15, 2021, 17 pages.

Goergen et al., "Dry gel conversion synthesis of zeolite EU-1 from low alkali containing precursors," From Zeolites to Porous MOF Materials—the 40th Anniversary of International Zeolite Conference, Elsevier B.V., Jan. 2007, 170: 444-445.

(56) References Cited

OTHER PUBLICATIONS

Jia et al., "Hierarchical ZSM-5 zeolite synthesized via dry gel conversion-steam assisted crystallization process and its application in aromatization of methanol," Powder Technology, Apr. 2018, 328: 415-429.
Matsukata et al., "Conversion of dry gel to microporous crystals in gas phase," Topics in Catalysis, Baltzer Science Publishers, Jan. 1999, 9(1/02): 77-92, 16 pages.
Wu et al., "Synthesis of Ti-MWW by a dry-gel conversion method," Catalysis Today, Jan. 2005, 99(1-2): 233-240, 234, 8 pages.

\* cited by examiner

DRY GEL SYNTHESIS OF NANO-SIZED ZSM-5

BACKGROUND

Catalytic reforming is a mature industrial technology in the petrochemical field, mainly used for the production of aromatics, alkenes, high octane gasoline, and hydrogen. During the reforming process, feedstocks, such as low-octane straight chain alkanes (paraffins), are reformed into branched alkanes (isoparaffins), cyclic naphthenes. These molecules are then partially dehydrogenated to produce high-octane aromatic hydrocarbons such as benzene, toluene and xylenes (BTX).

Bifunctional catalysts consisting of both metal and acid functions are mostly used in this process. Among these type of catalysts, medium pore size ZSM-5 represents the most commonly used zeolite. However, the efficiency and selectivity of ZSM-5 in this process may be limited by the diffusion of reagents into the zeolite network. Current research in catalytic reforming is primarily focused on improving the conversion rates for forming naphthenes and isoparaffins to maximum BTX products.

SUMMARY

An embodiment described herein provides a method of making a nano-sized zeolite. The method includes dissolving an aluminum source in a first portion of an aqueous solution of a templating agent to form a first mixture. The first mixture is added to a slurry of a silica source in a second portion of the aqueous solution of a templating agent to form an aluminosilicate fluid gel. The aluminosilicate fluid gel is stirred to allow reaction. The aluminosilicate fluid gel is dried to form a dry gel and the dry gel is hydrothermal treated in a hydrothermal treatment holder to form a solid product. The solid product is washed, dried, and calcined.

In an aspect, the aluminum source includes aluminum sulfate, aluminum metal, alumina, NaAlO2, or aluminum isopropoxide, or any combinations thereof. In an aspect, the templating agent includes tetrapropylammonium hydroxide (TPAOH). In an aspect, the silica source includes tetraethylorthosilicate (TEOS).

In an aspect, stirring the aluminosilicate fluid gel includes stirring for about 4 hours at a temperature of about 25° C. to about 30° C. In an aspect, drying the aluminosilicate fluid gel includes stopping the stirring, and heating the aluminosilicate fluid gel to about 80° C. for about 12 hours.

In an aspect, hydrothermal treating the dry gel includes loading the dry gel into the hydrothermal treatment holder, placing the hydrothermal treatment holder in an autoclave, adding water to the autoclave below the hydrothermal treatment holder, and heating the autoclave to about 170° C. for about 72 hours. In an aspect, the hydrothermal treatment holder includes a sample cup, a porous surface forming an internal bottom surface of the sample cup, and legs connected to the sample cup, wherein the legs hold the sample cup above a level of water in the autoclave. In an aspect, the porous surface is a ceramic configured to hold the dry gel while allowing steam to permeate the porous surface. In an aspect, the hydrothermal treatment holder is made from stainless steel. In an aspect, the hydrothermal treatment holder is made from a ceramic.

In an aspect, washing the solid product includes adding a volume of water that is about twice a volume of the solid product, shaking the solid product with the water, and separating the solid product from the water. In an aspect, separating the solid product includes removing the solid product from the water in an ultracentrifuge.

In an aspect, drying the solid product includes heating the solid product to about 110° C., and holding the solid product at 110° C. for about 12 hours. In an aspect, calcining the solid product includes ramping a temperature of the solid product from about 110° C. to about 550° C., and holding the temperature of the solid product at about 550° C. for about 7 hours. In an aspect, the temperature of the solid product is ramped from about 110° C. to about 550° C. at about 2° C./min.

Another embodiment described herein provides a hydrothermal treatment holder configured to hold a dry gel during a hydrothermal treatment. The hydrothermal treatment holder includes a sample cup, a porous surface forming an internal bottom surface of the sample cup, and legs connected the sample cup. The legs hold the sample cup above a level of water in an autoclave.

In an aspect, the porous surfaces a ceramic to hold the dry gel while allowing steam to permeate the porous surface. In an aspect, the hydrothermal treatment holder is made from stainless steel. In an aspect, the hydrothermal treatment holder includes a polymer line need to prevent contact the dry gel with the stainless steel. In an aspect, the hydrothermal treatment holder is made from a ceramic.

DETAILED DESCRIPTION

The microscale ZSM-5 commonly used as a catalyst has a simple microporous structure, a long diffusion pathway, and redundant strong acid sites. As a result of these features, this type of zeolite often experiences rapid deactivation of catalyst and lower diffusion of bulky molecules during the catalytic processes, which negatively effects the selectivity and final reaction products. The poor diffusion efficiency may be improved by reducing the particle size of the zeolites. Further, reducing the particle size will improve the performance of the zeolite catalyst by increasing the external surface area, which shortens the diffusion path of the molecules.

Embodiments described herein provide a synthesis method for zeolite ZSM-5 particles that uses a dry gel conversion (DGC) process. The resulting particles are substantially uniform in shape, and nano-sized, for example, having a substantial portion of particles that are less than about 100 nm in a largest dimension. The nano-sized ZSM-5 zeolite based catalysts decrease the large molecule diffusion problem in light naphtha aromatization processes.

In the DGC process described herein, the organic solvent and water in the zeolite precursor are evaporated prior to a hydrothermal treatment in an autoclave. As a result, the silica and alumina precursors are in close contact with each other and, during the hydrothermal treatment, more nuclei can be quickly formed. Therefore, compared with other methods, DGC method helps improving the quality and quantity of the final products, for example, providing increase in crystallinity of about 20%, and an increase in the product yields of about 5-10 wt. %. Further, because the dry gel is a solid, more gel can be hydrothermally treated in a single vessel in comparison to conventional hydrogel techniques that thermally treat water solutions. The increased efficiency will also increase product yields.

Figure 1:
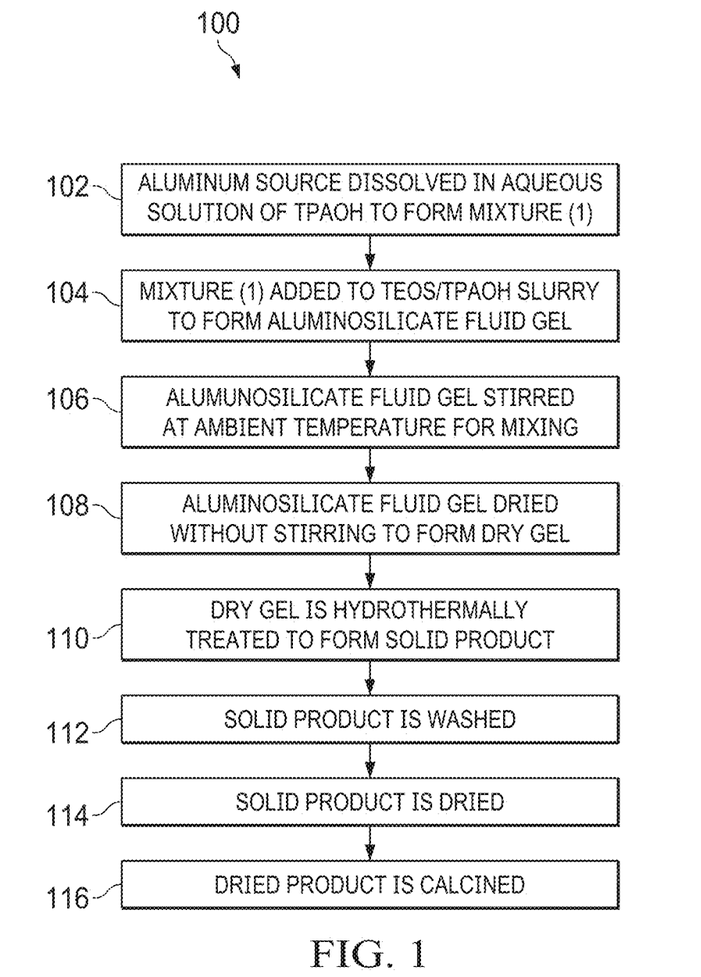
FIG. 1 is a process flow diagram of a method for making a nano-sized ZSM-5.

FIG. 1 is a process flow diagram of a method 100 for making a nano-sized ZSM-5. In some embodiments, the silica source is tetraethylorthosilicate (TEOS) for example, which is available from Sigma-Aldrich, among others. In some embodiments, the aluminum source is aluminum sulfate ($Al_2(SO_4)_3 \cdot 18H_2O$), which is available from Sigma-Aldrich, among others. In other examples, the aluminum source is aluminum sulfate, aluminum metal, alumina, $NaAlO_2$, or aluminum isopropoxide, or any combinations thereof. In some embodiments, the templating agent is tetrapropylammonium hydroxide (TPAOH), which is available from Sigma-Aldrich as a 40% aqueous solution. In an embodiment, the molar ratio of the ingredients used for the synthesis of the gel composition is about 60 $SiO_2$: 21.4 TPAOH: 1 $Al_2O_3$: 650 $H_2O$, although other molar ratios may be used in other embodiments. Further, the techniques described herein are not limited to the production of nano-sized ZSM-5, but may be used to produce other types of zeolites. Accordingly, other templating agents may be used for different zeolites.

The method 100 begins at block 102, where the aluminum source is dissolved in a portion of the templating agent solution, for example, the TPAOH solution described herein. In embodiments, the portion may be about 25 percent of the TPAOH solution, about 50 percent of the TPAOH solution, or about 75 percent of the TPAOH solution. Generally, enough of the TPAOH solution is used to form a clear mixture.

At block 104, the clear mixture is added to a slurry formed by mixing the TEOS with the remaining portion of the templating agent solution, forming an aluminosilicate fluid gel. The clear mixture may be added slowly to the slurry, or drop wise. At block 106, the aluminosilicate fluid gel is stirred at ambient temperature for about four hours. As used herein, ambient temperature is about 25° C. However, in some embodiments, the aluminosilicate fluid gel may be stirred at about 15° C., at about 20° C., or at about 30° C., among other temperatures.

At block 108, the aluminosilicate fluid gel is dried without stirring to remove water and alcohols. The drying may be performed for about eight hours, about 12 hours, about 16 hours, or longer. The drying process is performed at about 80° C., although the aluminosilicate fluid gel may be dried at about 70° C., or at about 90° C. Determination of the conditions is made by the formation of a dry gel.

At block 110, the dry gel is loaded into a hydrothermal treatment holder that is placed into an autoclave. Water is added to the autoclave, wherein a level of the water is below the hydrothermal treatment holder. The dry gel is then hydrothermally treated at about 170° C. for about three days. The hydrothermal treatment temperature may be in a range of about 150° C. to about 190° C. The hydrothermal treatment time may be in a range of about one day to about five days. The hydrothermal treatment holder, as discussed herein, is designed to allow steam to permeate through a porous surface supporting the dry gel. The hydrothermal treatment forms a solid product from the dry gel.

At block 112, the solid product is washed three times, for example, with distilled water. In some embodiments, the solid product may be washed with a mixture of distilled water and an alcohol, such as methanol or ethanol. After each washing, the solid product is separated from the solvent, for example, using an ultracentrifuge (10000 rpm), or other techniques. The amount of the liquid used to wash the solid product at each iteration is roughly twice the volume of the solid product.

At block 114, the solid product is dried, for example, at about 110° C. for about 12 hours to about 16 hours. In some embodiments, the solid product may be dried at a temperature of between about 90° C. and about 130° C. for a period of about eight hours to about 24 hours. The solid product may be dried for longer periods of time at lower temperatures, or for shorter periods of time at higher temperatures. After drying, at block 116, the solid product is calcined at about 550° C. for about seven hours, wherein the temperature is ramped up to the 550° C. calcining temperature from the drying temperature at about 2° C./min.

Figure 2:
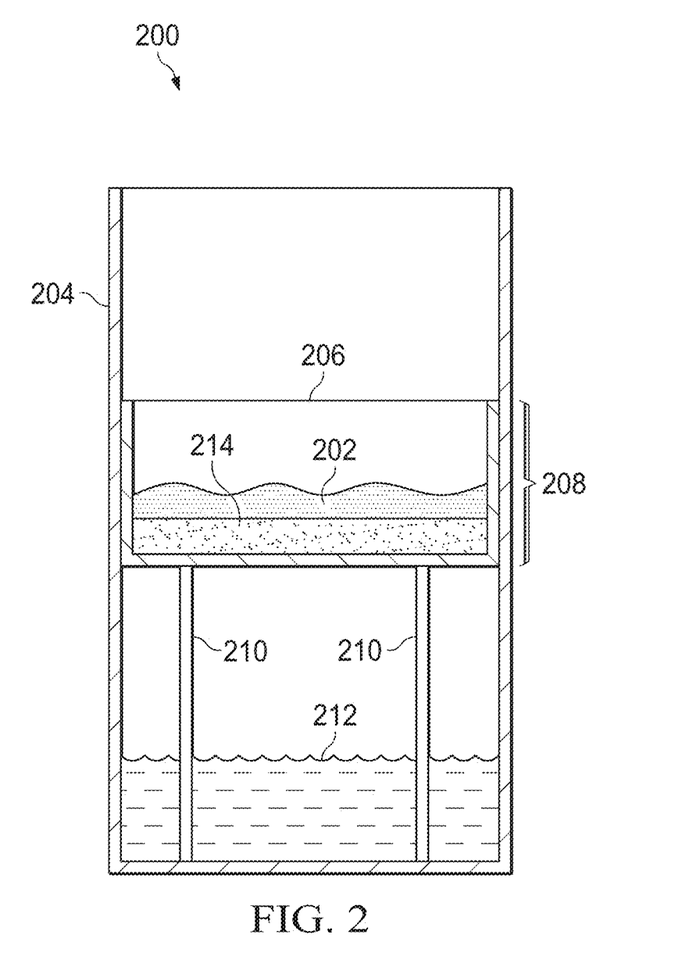
FIG. 2 is a drawing of a holder for hydrothermal a treating a dry gel in an autoclave.

FIG. 2 is a schematic diagram of a hydrothermal treatment 200 of a dry gel 202 in an autoclave 204. In embodiments described herein, the hydrothermal treatment 200 is performed using a hydrothermal treatment holder 206. The hydrothermal treatment holder 206 may be made from a metal, such as stainless steel or titanium, or a ceramic.

The hydrothermal treatment holder 206 has a sample cup 208 to hold the dry gel 202. If the hydrothermal treatment holder 206 is made from a metal, the sample cup 208 may be lined with polytetrafluoroethylene (PTFE), or another polymer, such as polyphenylene sulfide (PPS) to protect the zeolite from contamination with the metal.

Legs 210 support the sample cup 208 above water 212 that has been added to the autoclave 204. A porous surface 214, such as a ceramic membrane, formed the bottom surface of the sample cup 208. The porous surface 214 supports the dry gel 202. The porous surface 214 allows steam from the water 212 to permeate up to and through the dry gel 202.

EXAMPLES

Synthesis of Nano-Sized ZSM-5

To synthesize the non-sized ZSM-5, 1.11 g of aluminum sulfate was added to 18.1 g of a 40 wt. % TPAOH solution and dissolved to form a clear solution. 8.1 g $H_2O$ were then added to the clear solution. The prepared mixture was then added to the slurry made by 20.83 g of TEOS mixing with the other part of the TPAOH-containing aqueous solution.

The formed aluminosilicate fluid gel was stirred in a beaker at about 25° C. for 4 h. Stirring was stopped, and the gel was dried for 18 hours at 80° C. The dried gel was place in a hydrothermal treatment holder, as described with respect to FIG. 2. The hydrothermal treatment holder was placed in an autoclave to which water has been added, below the hydrothermal treatment holder. The dry gel was then hydrothermally treated at 170° C. for 72 hours The solid product was removed from the hydrothermal treatment holder and washed three times. The washing was performed with deionized water in an amount roughly double that of the solid material. Between each washing, the solid product was separated from the DI water using an ultracentrifuge run at 10,000 RPM.

After washing, the solid product was dried at 110° C. for 18 hours. The temperature was then ramped up from 110° C. to 550° C. at 2° C./min. These solid product was then held at 550° C. for seven hours for calcining.

Test Procedures

Particle Size

Figure 3:
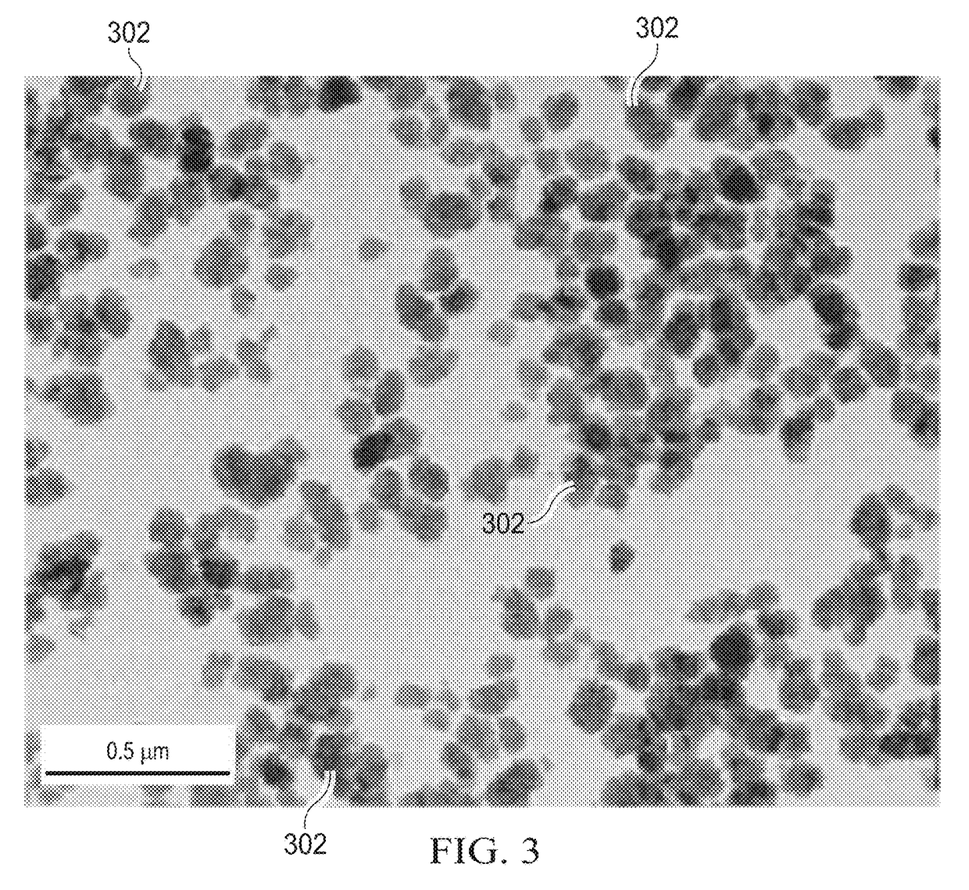
FIG. 3 is a transmission electron micrograph of a nano-sized ZSM-5.

The particle sizes of ZSM-5 are measured by TEM (Transmission electron microscopy) under the same condition. FIG. 3 is a transmission electron micrograph of particles 302 of a nano-sized ZSM-5.

Sample Texture Properties

The sample texture properties, including surface areas, pore volumes, pore sizes, and pore size distributions, were characterized by physisorption using the Brunaure, Emmett, and Teller (BET) technique on data acquired from a Quantachrome Autosorb iQ instrument. Before adsorption, the samples were calcined at 873K for 4 hrs. Approximately 30-40 mg of powder samples were degassed in a sample preparation station under 473K and 1.33E-3 Pa for 15 hours, then switched to the analysis station for adsorption and desorption under liquid nitrogen at 77K with an equilibrium time of 2 minutes. The surface area was calculated with the multipoint BET equation with linear region in the P/Po range of 0.05 to 0.35. Pore volume was calculated from the maximum adsorption amount of nitrogen at P/Po=0.99.

Crystallinity and Phase Purity

The crystallinity and phase purity of these solid product was measured by powder X-ray diffraction (XRD) using a Rigaku Ultima IV multi-purpose diffractometer with a copper X-ray tube. The scanning range was set between 2° to 50° in 2θ Bragg-angles with a step size of 0.04° and the total counting time of 1° per minute. The crystallinity percentage was calculated by PANalytical High Score Plus software through the comparison of the area under the most intense diffraction peak, at 22.8° (2θ), to that of patterns of the reference zeolite. The crystallinity of the reference zeolite is taken as 100%.

Figure 4:
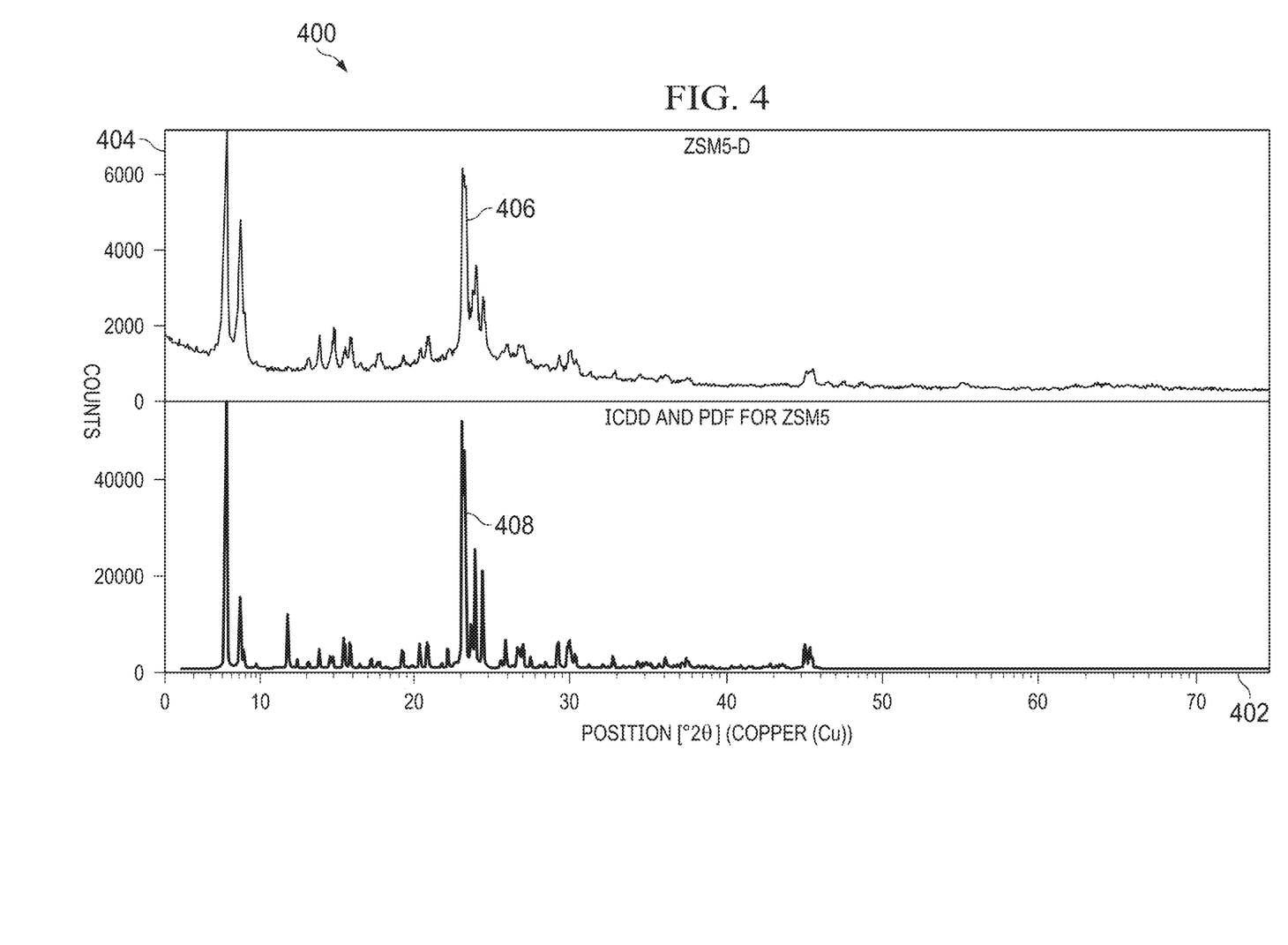
FIG. 4 is a plot of a powder x-ray diffraction of an experimental sample versus a reference sample.

FIG. 4 is a plot of a powder x-ray diffraction of an experimental sample versus a reference sample. The results of the powder XRD are shown in the plots 400 of FIG. 4. In these plots 400, the x-axis is the position 402 of the copper x-ray tube in Bragg angles. The y-axis is the counts 404 of photons received at the detector. The experimental sample 406 of nano-sized ZSM-5 is shown in the top plot, while the reference sample 408 of the microscale ZSM-5 is shown in the bottom plot.

Calculation of Molar Ratio of $SiO_2$ and $Al_2O_3$

The Si and Al content were measured by XRF (X-ray florescence), and then used to calculate the $SiO_2/Al_2O_3$ ratio. For the test sample, XRF results shown in Table 1 were used to calculate the ratio as $SiO_2/Al_2O_3$ molar ratio=33.9.

TABLE 1

XRF analysis results for test sample

| | Element | Conc. (%) |
|---|---|---|
| 1 | O | 54.0 |
| 2 | Si | 42.39 |
| 3 | Al | 2.50 |
| 4 | Na | 1.03 |
| 5 | Fe | 0.03 |

Properties of Nano-Sized ZSM-5

The main properties of the synthesized zeolite include particle sizes of between about 10 nanometers (nm) and about 100 nm. The synthesized zeolite particles had a surface area of between about 500 meters squared per gram ($m^2/g$) and 700 $m^2/g$. Further, the synthesized zeolite particles had a pore volume of between about 0.5 mL per gram (mL/g) and about 1.0 mL/g.

TABLE 2

Comparative properties of ZSM-5

| SAMPLE NAME | Reference Nano-ZSM-5 | Present invented Nano-ZSM-5 | Conventional micro-sized ZSM-5 |
|---|---|---|---|
| Particle sizes, nm | 90 | 80 | 500-3000 |
| Crystallinity by XRD | 61 | 88 | 95 |
| $SiO_2/Al_2O_3$ molar ratio | 35 | 34 | 30 |
| Product yields, wt. % | 78 | 85 | — |

The reference nano-sized ZSM-5 was synthesized by using the method described in Microporous Mesoporous Materials 39 (2000) 135-147. The conventional commercial micro-sized ZSM-5 (CBV 3024E) was obtained from Zeolyst.

The yield was calculated by dividing the weight of the solid product by the total of the weight of the $SiO_2$ and the $Al_2O_3$ originally added into the mixture, and multiplying by 100. The water and TEAOH are vaporized or burn out during calcination. Therefore, the final product is made from $SiO_2$ and $Al_2O_3$.

Other implementations are also within the scope of the following claims.

What is claimed is:

1. A method of making a nano-sized ZSM-5 zeolite, comprising:
    dissolving an aluminum source in a first portion of an aqueous solution of a templating agent to form a first mixture, wherein the templating agent comprises tetrapropylammonium hydroxide (TPAOH);
    adding the first mixture to a slurry of a silica source in a second portion of the aqueous solution of a templating agent to form an aluminosilicate fluid gel
    stirring the aluminosilicate fluid gel to allow reaction;
    drying the aluminosilicate fluid gel to form a dry gel;
    hydrothermal treating the dry gel in a hydrothermal treatment holder to form a solid product;
    washing the solid product;
    drying solid product; and
    calcining the solid product to form the ZSM-5, wherein the molar ratio of SiO2 to Al2O3 in the nano-sized ZSM-5 is about 33.6, and wherein the nano-sized ZSM-5 has an average particle size less than 100 nm.

2. The method of claim 1, wherein the aluminum source comprises aluminum sulfate, aluminum metal, alumina, $NaAlO_2$, or aluminum isopropoxide, or any combinations thereof.

3. The method of claim 1, wherein the templating agent comprises tetrapropylammonium hydroxide (TPAOH).

4. The method of claim 1, wherein the silica source comprises tetraethylorthosilicate (TEOS).

5. The method of claim 1, wherein stirring the aluminosilicate fluid gel comprises stirring for about 4 hours at a temperature of about 25° C. to about 30° C.

6. The method of claim 1, wherein drying the aluminosilicate fluid gel comprises:
    stopping the stirring; and
    heating the aluminosilicate fluid gel to about 80° C. for about 12 hours.

7. The method of claim 1, wherein hydrothermal treating the dry gel comprises:
    loading the dry gel into the hydrothermal treatment holder;
    placing the hydrothermal treatment holder in an autoclave;

adding water to the autoclave below the hydrothermal treatment holder; and heating the autoclave to about 170° C. for about 72 hours.

8. The method of claim 7, wherein the hydrothermal treatment holder comprises:

a sample cup;

a porous surface forming an internal bottom surface of the sample cup; and legs connected to the sample cup, wherein the legs hold the sample cup above a level of water in the autoclave.

9. The method of claim 8, wherein the porous surface is a ceramic configured to hold the dry gel while allowing steam to permeate the porous surface.

10. The method of claim 8, wherein the hydrothermal treatment holder is made from stainless steel.

11. The method of claim 8, wherein the hydrothermal treatment holder is made from a ceramic.

12. The method of claim 1, wherein washing the solid product comprises:

adding a volume of water that is about twice a volume of the solid product;

shaking the solid product with the water; and separating the solid product from the water.

13. The method of claim 12, wherein separating the solid product comprises removing the solid product from the water in an ultracentrifuge.

14. The method of claim 1, wherein drying the solid product comprises:

heating the solid product to about 110° C.; and holding the solid product at 110° C. for about 12 hours.

15. The method of claim 14, wherein calcining the solid product comprises:

ramping a temperature of the solid product from about 110° C. to about 550° C.; and holding the temperature of the solid product at about 550° C. for about 7 hours.

16. The method of claim 15, wherein the temperature of the solid product is ramped from about 110° C. to about 550° C. at about 2° C./min.

* * * * *